No. 838,455. PATENTED DEC. 11, 1906.
R. H. RICE.
COMBINED EMERGENCY AND THROTTLE VALVE.
APPLICATION FILED MAR. 31, 1904.
4 SHEETS—SHEET 4.
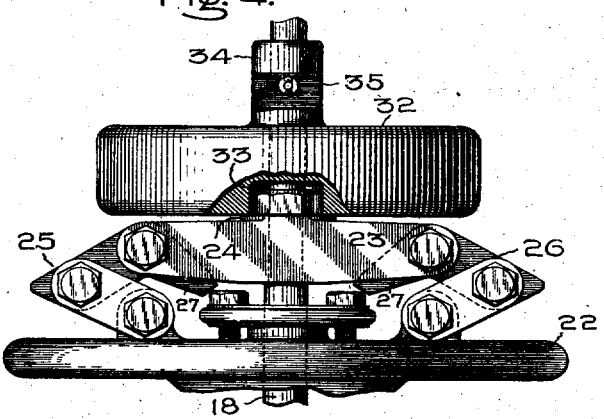
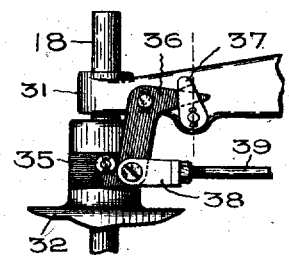 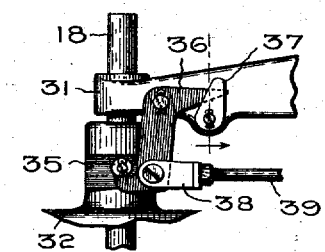 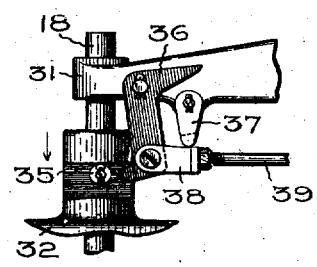
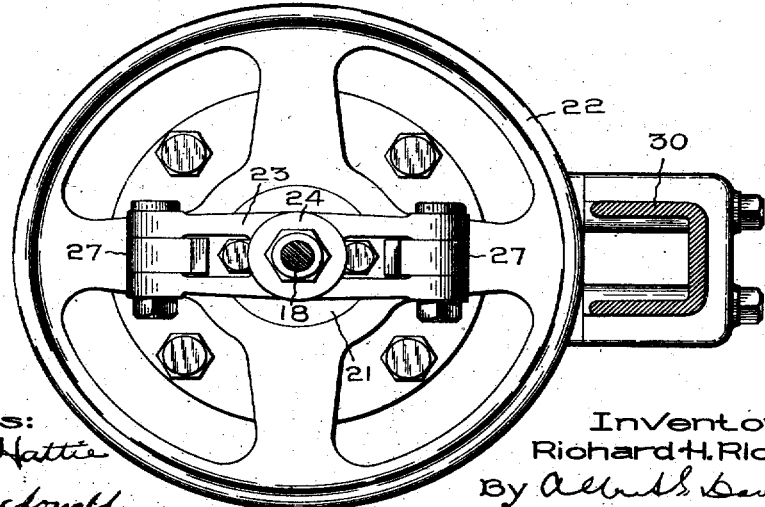
Witnesses:
Frank G. Hattie
Alex F. Macdonald
Inventor,
Richard H. Rice,
By Albert S. Davis
Att'y.

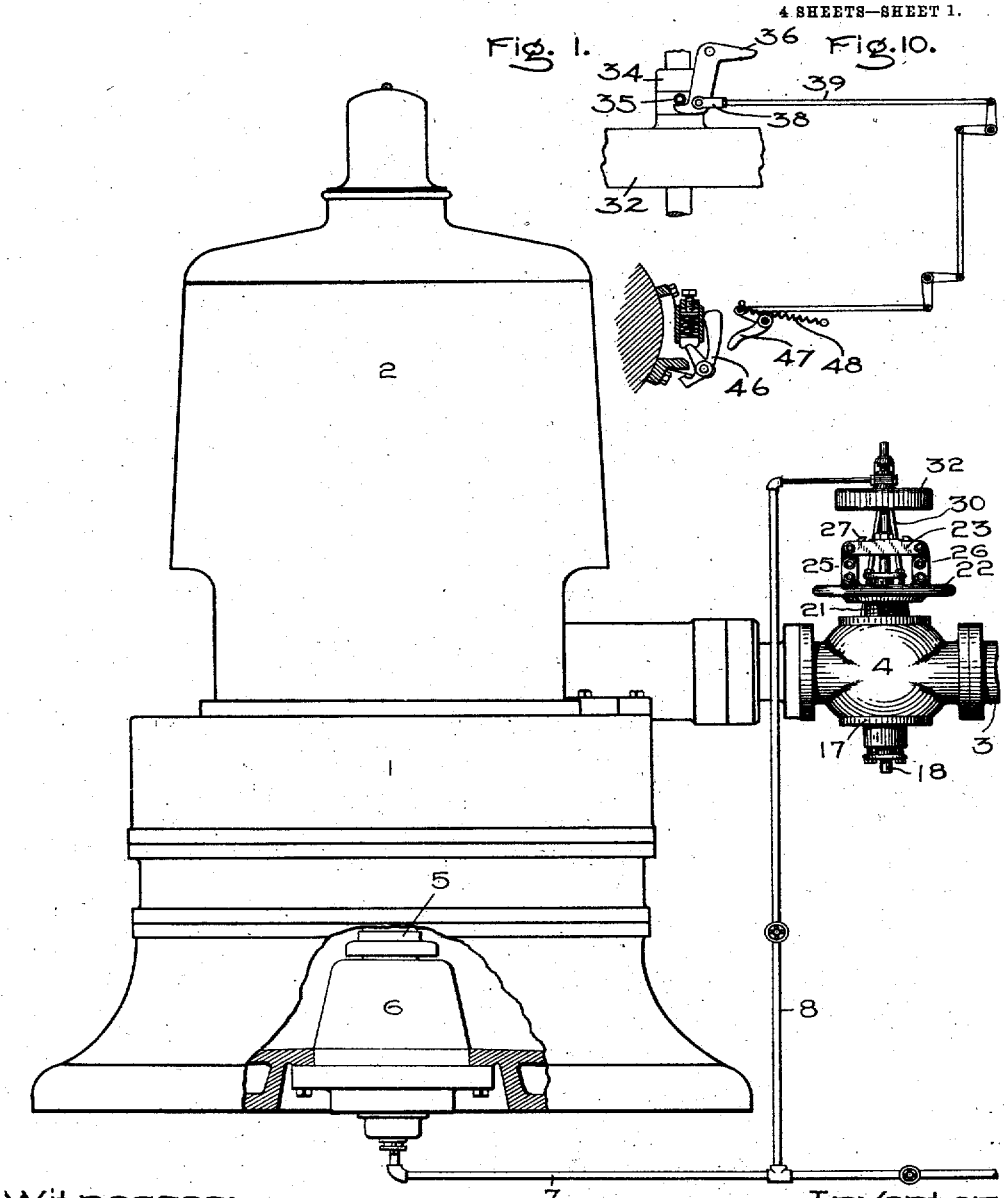

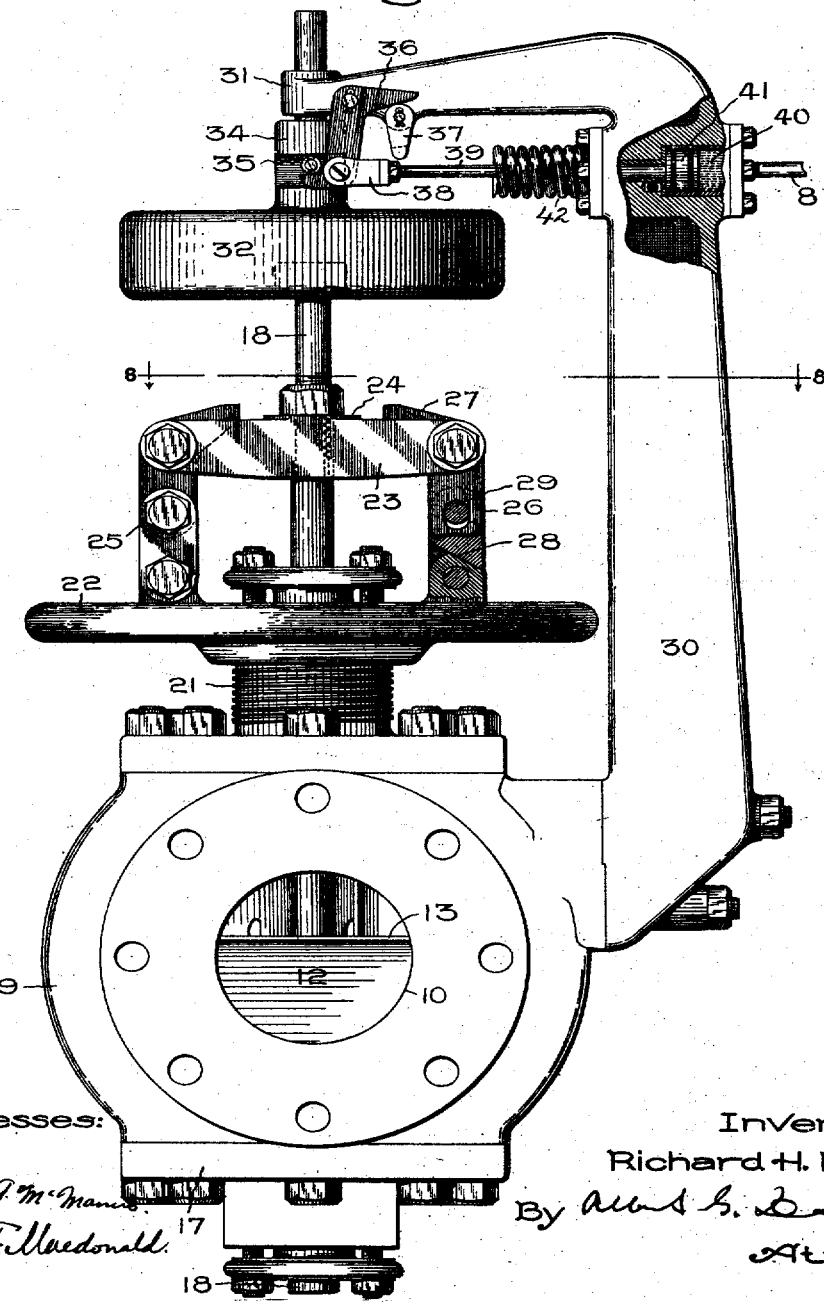

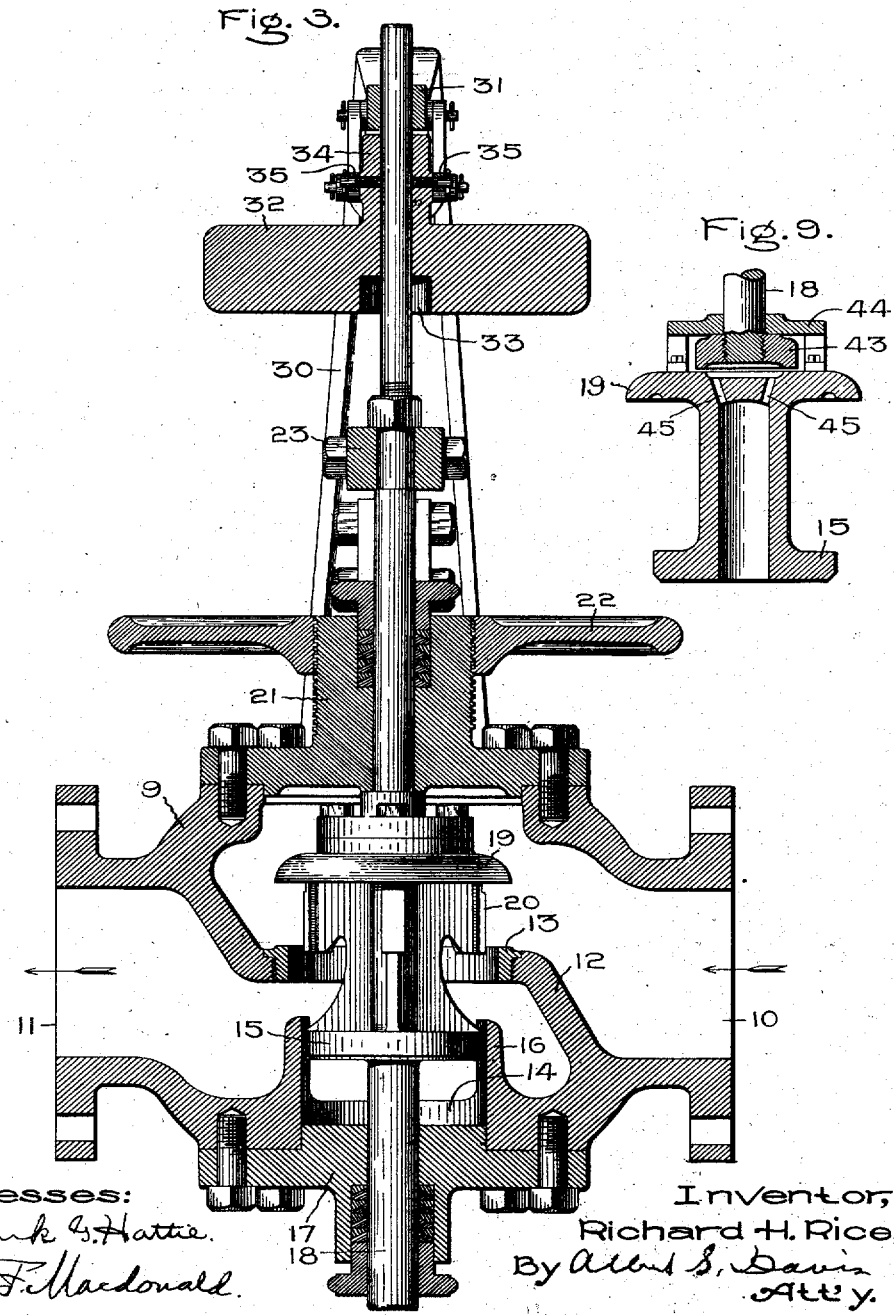

UNITED STATES PATENT OFFICE.

RICHARD H. RICE, OF LYNN, MASSACHUSETTS, ASSIGNOR TO GENERAL ELECTRIC COMPANY, A CORPORATION OF NEW YORK.

COMBINED EMERGENCY AND THROTTLE VALVE.

No. 838,455.      Specification of Letters Patent.      Patented Dec. 11, 1906.

Application filed March 31, 1904. Serial No. 200,385.

*To all whom it may concern:*

Be it known that I, RICHARD H. RICE, a citizen of the United States, residing at Lynn, county of Essex, State of Massachusetts, have invented certain new and useful Improvements in a Combined Emergency and Throttle Valve, of which the following is a specification.

The present invention has for its object to provide a valve for controlling the admission of elastic fluid to a prime mover or other energy-consuming device which may be operated in the usual manner to throttle or cut off the passage of fluid under normal conditions or by automatic means in response to abnormal or emergency conditions.

In carrying out my invention I provide a casing in which is mounted a valve that has a constant tendency to close. This tendency may be and is preferably due to an unbalanced condition as to pressure or to gravity, or to a combination of both. In order to reduce the shock when the valve closes automatically, a dash-pot may be employed. I prefer to employ a dash-pot comprising a piston and cylinder, which is located within the valve-casing and arranged to trap a certain amount of fluid within the cylinder, the said fluid acting as a cushion. In the preferred construction the effective action of the dash-pot does not take place until the valve is partially closed. To the valve-stem is attached an actuating mechanism for opening and closing the valve manually or by power in case the valve is of such size or is operated under conditions that require it. The actuating mechanism ordinarily forms a rigid connection between the valve and the hand-wheel or equivalent device, and as the wheel is rotated in one direction or the other it opens or closes the valve. The wheel and actuating means are so arranged that the valve can be set in any desired position—such as full, open, or at intermediate position—without interfering with the operation of the emergency mechanism.

Included in the actuating mechanism is what I term "a breakdown or collapsible connection," which may be made in a variety of ways. I prefer one which includes one or more toggles, two being illustrated in the present embodiment of the invention. When the toggles are in working relation, they form a rigid connection between the valve-stem and the wheel; but when collapsed or in a relaxed condition the valve can be operated without regard to the wheel or to its position.

In order to break the toggle connections, one member of each toggle is provided with an arm or projection, which is struck by a descending weight or equivalent device that responds to abnormal conditions. The arms or projections are so related to the other parts of the mechanism that as soon as the toggles are broken they move out of the path of the weight, so that the effect of the latter is delivered directly to a robust part of the structure, which is directly united with the valve. The weight or equivalent device is normally retained in position by a device which is responsive to some abnormal condition, such as changes in fluid-pressure. For example, the parts may be retained in position by a piston and cylinder, which are subjected to the pressure of the lubricant supplied to one or more bearings of the prime mover being controlled, or the weight or equivalent device may be restrained by a device which responds to abnormal speed conditions.

When my invention is applied to vertical turbines, wherein the step-bearing blocks are separated by a film of oil or other lubricant under pressure, I prefer to connect the cylinder with the pipe conveying lubricant to the step-bearing, since it is essential in such a construction to maintain a constant or substantially constant pressure thereon. I find it preferable, although not necessary, to sustain the weight by one or more latches, and to move the latch by the rod of the piston, since it is conducive to simplicity and also reduces the size of the structure as a whole. I prefer to place the valve in a vertical position, since by so doing I am enabled to employ a gravity-actuated means for closing it without intervening levers. This action is augmented by the fact that the area on the high-pressure side of the valve is in access of that on the low and to a limited extent by the weight of the valve and attached parts.

In event of the pressure on the valve being too great to permit of its being opened manually without undue exertion, I may provide a secondary valve within the main valve and of smaller area, which when opened admits high-pressure fluid to balance or substantially balance the main valve.

The valve, dash-pot piston, actuator, and weight are in the same straight line, and the valve-stem which passes through them is guided by the casing at the lower end and by an arm at the upper end, which is supported by the casing. In this manner the alinement of the parts is preserved at all times. The arm also forms a support for the cylinder of the emergency device, or the cylinder may be formed in the arm.

One of the many advantages of my improved construction resides in the fact that each time the valve is opened or closed, as in starting and stopping the turbine, it is, in fact, tested, whereas with ordinary emergency devices forming a separate structure they are seldom, if ever, tested and in event of an emergency frequently fail to respond, which may mean the ruination of expensive apparatus. The weight being in the open air there is nothing to interfere with its operation.

In order to prevent the emergency device from operating when the machine is shut down and the fluid-pressure on the bearing is *nil* or is greatly reduced, a lock is provided which prevents the weight or other device from acting at such times.

The lock is set by hand in an initial position, and as the controlling force of the emergency device decreases it assumes an operative or active position with respect to the weight-sustaining means. A further decrease in the controlling force has no effect, and the lock directly or indirectly prevents the weight or equivalent device from operating. Upon a definite increase or renewal of pressure the lock releases the weight and falls back to or assumes an inoperative position. By means of this construction all danger due to carelessness on the part of the engineer due to leaving the lock in place is obviated. To state the matter in a different way, a lock is provided for the emergency-valve which is set by hand and is released automatically under proper conditions.

In the accompanying drawings, which illustrate one embodiment of my invention, Figure 1 is a view in side elevation of a vertical turbine provided with my improved throttling and emergency valve. Fig. 2 is an enlarged view, in side elevation, of the combined emergency and throttle valve. Fig. 3 is a vertical section of the same, taken at right angles to that of Fig. 2. Fig. 4 is a detail view showing the toggles in an inoperative or collapsed position. Figs. 5, 6, and 7 are detail views illustrating the several positions of the weight-locking device. Fig. 8 is a sectional view taken on line 8 8 of Fig. 2 looking in the direction of the arrow. Fig. 9 is a detail sectional view of a slight modification, showing a secondary valve by means of which the pressures are balanced or substantially balanced on the main valve preparatory to opening it; and Fig. 10 is a detail view showing a weight-releasing means which is responsive to abnormal speed conditions.

1 represents a turbine of the vertical type, and situated above it and driven by the turbine-shaft is a dynamo-electric machine or other load 2. Steam or other elastic fluid is supplied to the turbine by the conduit 3, and mounted in the conduit between the source of fluid-supply and the turbine is a combined emergency and throttle valve 4. The shaft 5 of the turbine is disposed vertically and is supported by a step-bearing 6 of suitable construction, through which oil or other lubricant under pressure is supplied by the pipe 7. Connected to this pipe and in multiple therewith is a pipe 8, that supplies fluid under pressure to the piston and cylinder which control the operation of the emergency mechanism of the valve, as will hereinafter appear.

Referring more particularly to Figs. 2 and 3, 9 represents the valve-casing, having an inlet-port 10 and a discharge-port 11. Located within the casing is a partition 12, which supports the removable valve-seat 13. The casing is also provided with a cylinder 14 on the lower side, in which is mounted a piston 15, that acts as a dash-pot plunger to cushion the closing of the valve. The walls of the casing are extended, as at 16, to form guides for the piston. The cylinder is provided with a detachable head 17, through which extends the valve-rod 18, the latter being provided with a packing to prevent the escape of fluid. As arranged, the piston is free to move downwardly until its lower surface passes the upper edge of the cylinder, after which the steam or other elastic fluid trapped in the cylinder will cushion its further movement.

Mounted on the stem 18 is a combined throttle and emergency valve 19, which is provided with a flat under surface that engages with the valve-seat 13. The valve is provided with guides 20, which engage the cylindrical surface of the valve-seat. The portion of the stem above the valve is somewhat smaller than the portion below the piston 15, which renders the valve slightly unbalanced, due to the difference in areas exposed to the fluid. When the valve is in close proximity to the seat, it is unbalanced to a still greater extent, owing to the relatively restricted passage between it and the seat, and when the valve is finally seated it is exposed to the total pressure of the incoming fluid, which firmly holds it in place. The upper side of the casing is provided with a detachable head 21, which is secured to the casing by bolts. The head is provided with a hub having a central opening to receive the valve-stem and also to receive the packing for preventing the escape of fluid around the stem. The hub is threaded exteriorly to receive the hand-wheel 22 for closing the valve when it is desired to shut down the turbine in the ordinary manner. At a point above the hand-wheel the stem is shouldered, and seated on this shoulder and held in place by a nut is a yoke 23. The yoke is provided with a slightly-raised portion 24, upon which the weight of the emergency device strikes when it is released. Pivotally attached to the ends of the yoke and to the hand-wheel are toggles 25 and 26. Formed integral with the upper ends of each upper member of the toggles and pivotally attached to the yoke is an arm or projection 27, which is adapted to be struck by the falling weight for opening or rendering the toggles inoperative. The lower ends of the upper members of the toggles are provided with beveled surfaces 28, which engage correspondingly-beveled projections carried by the hand-wheel, which surfaces normally maintain the members of the toggles in the position shown in Fig. 2 and prevent them from breaking inwardly. 29 represents the pivots for uniting the members of the toggles, and the openings in the upper members are somewhat larger than the pivots to enable the toggles to open freely.

Bolted to the side of the valve-casing is an arm or frame-piece 30, which at its upper end is provided with a guide or bearing 31 for the upper end of the valve-stem. Loosely mounted on the valve-stem and below the guide 31 is a weight 32 for breaking down the toggles or rendering them inoperative in times of emergency. The under side of the weight is provided with an opening 33, which is slightly larger than the nut above the yoke, so that the effect of the weight when tripped is directly imparted to the surface 24 of the yoke instead of to the nut. The upper side of the weight is provided with an elongated hub 34, which acts as a guide therefor, and mounted on the hub at diametrically opposite points are pins, each of which is provided with an antifriction-roller 35. Pivotally supported on the arm 30 are latches 36, having oppositely-projecting ends. The lower end of each latch is adapted to engage an antifriction-roller, while the upper end of one latch is adapted to engage a pivoted locking device 37, the latter being carried by the arm 30. Simultaneously motion is imparted to both latches by means of a U-shaped yoke 38, the latter being attached to a piston-rod 39. Formed in the arm 30 is a cylinder 40, containing a piston 41, that is attached to the piston-rod 39, and surrounding the rod is an extension-spring 42, which is secured at its outer end to the rod and at its inner end to the arm 30. This spring tends at all times to pull the latches out from under the antifriction-rollers and permit the weight to drop. This tendency is opposed by the fluid in the cylinder, which is supplied by the pipe 8 from a suitable source of supply, such as the lubricating system of the step or other bearing.

In Fig. 4, 22 represents the hand-wheel, and 32 the weight. The toggles 25 and 26 are shown in a collapsed or inoperative position, and the under side of the weight is in engagement with the projection 24 on the toggle-yoke. This figure represents the position of the parts after the emergency device has operated.

In Fig. 5 is shown the relation which the parts occupy when the fluid-pressure on the emergency-piston is normal and the locking device 37 is in the initial position.

It is to be noted that a line passing through the center of the pivoted lock would be at one side of a vertical plane passing through the pivot, as indicated by the dotted line. In other words, the center of gravity of the lock is located at the left of a vertical line through its fulcrum. The hook on the outer end of the lock is beveled, as indicated by the dotted line, so that it will swing the lock to the right as the lower end of the bell-crank or latch 36 moves to the right.

In Fig. 6 the piston-rod 39 has moved in the direction of the arrow to a limited extent and caused the upper end of the latch to move the lock 37 to the operative or active position, which is on the opposite side of the central plane shown by the dotted line. In other words, the center of gravity of the lock is now on the right-hand side of the dotted line. The beveled surface on the hook at the end of the lock is now in engagement with upper surface of the latch. The lower end of the latch is moved to its extreme position under the present conditions, and the weight is prevented from falling no matter what the pressure is on the piston 41. If now the pressure is reëstablished, the upper projection on the latch will be lowered as the latch swings about its pivot, and owing to the fact that the center of gravity of the lock is at the right of the central plane the lock will swing around its fulcrum and assume its normal position. It will thus be seen that the lock is set by hand and released automatically upon the restoration of the normal conditions.

In Fig. 7 the latch 36 is shown out of engagement with the weight, and it is assumed that the latter has started on its downward movement, as indicated by the arrow. In this figure the piston-rod 39 is assumed to be at or about the end of its inward movement. The lock 37 is in a position of rest.

When the turbine is running, the latch 36 will be held in the position shown in Fig. 5 by reason of the pressure of the fluid on the piston 41, but the lock 37 will occupy the position shown in Fig. 7. It will thus be seen that with the members in this relation the latch will be released to permit the weight to fall in case of emergency conditions. When it is desired to shut down the turbine, the attendant first throws the lock from its hanging or normal position (shown in Fig. 7) to the position shown in Fig. 5. The attendant next closes the steam-valve by means of the hand-wheel. After the turbine is shut down the hydraulic pressure on the step-bearing is relieved and also the pressure of the piston 41. The piston will now move slightly to the right under the action of its spring, thereby moving the latch, so as to permit the lock to assume the unstable but locked position shown in Fig. 6. The latch is now locked in place and holds the weight in raised position. When it is desired to start the turbine again, the fluid-pressure on the step-bearing is first established. This pressure also acting on the piston 41 will cause the latch to move to position shown in Fig. 5, and thus permit the lock to fall from its normal hanging position by reason of the unstable balance it occupied previously to the movement of the latch toward the left, and this without any thought on the part of the attendant. The attendant now opens the steam-valve by means of the hand-wheel, so as to admit steam to the turbine. Since the lock is suspended free from the latch, the latter will immediately release the weight in case the pressure on the step-bearing should accidentally fall below normal for any reason, and thereby cause the valve to be closed by the falling of the weight.

In Fig. 8, 22 represents the hand-wheel, and 23 the yoke, which is forked at its ends to receive the toggle-levers, the parts being shown in plan. The tripping arms or projections 27 are shown in full lines and the toggles are in operative position. 18 represents the valve-stem which is surrounded by the nut, the latter engaging with the projection 24, upon which the falling weight strikes.

Assuming that the weight has fallen and the connection between the valve-stem and hand-wheel is collapsed, as in Fig. 4, the first thing is to see that the pressure on the step or other bearing is brought up to normal, after which the weight is raised by hand and retained by the latches 36. These latches may or may not be secured by the lock 37. Instead of the above the weight may first be raised and locked and then the pressure brought to normal. The hand-wheel is then rotated to move it downwardly toward the casing, and as this action takes place the members of the toggles gradually straighten until the pivots 29 are in line with those on the yoke and hand-wheel. Reversing the direction of motion of the hand-wheel causes the members of the toggles to lock, with the centers of the pivots 29 slightly over the dead-centers. Continued motion in the same direction will open the valve by any desired amount.

In Fig. 9, 19 represents the valve as before, and 15 the piston of the dash-pot. On the top of the valve is a flat seat with which the secondary or relay valve 43 engages. Attached to the upper side of the main valve and extending across the relay-valve is a yoke 44. Between the upper side of the valve and the yoke is a small space, which permits the valve to be raised sufficiently to permit steam to pass through the ports 45 to the under side of the piston 15, and thus balance the pressure to a large extent. To the relay-valve is attached the stem 18, which is operated as above described. When the emergency-weight drops, the relay-valve closes first and then the main valve. The closing of the relay-valve shuts off the ports 45, and the piston 15 acts to cushion the closing of the valve as before.

In Fig. 10 the latch 36 is under the control of an emergency-governor, comprising a weight 46, mounted on the main shaft or driven thereby and responsive to conditions of excess speed. When the weight moves a certain distance away from the shaft, it hits the arm 47, which is attached to the latch 36 through bell-crank levers and connecting-rods. This has the effect of withdrawing the support for the weight, and the latter falls and closes the main valve. A spring 48, normally under tension, holds the parts in the position shown, and when the emergency-weight operates the spring passes over the dead-center and moves the rods and connecting-levers. In other words, the spring is a motor which acts to release the latch. For the purpose of illustration the distance that the spring has to travel in passing over the dead-center has been exaggerated.

In accordance with the provisions of the patent statutes I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is—

1. In a valve of the character described, the combination of a casing, a valve, a means located exterior to the casing for moving the valve under normal conditions, a connection between the valve and the means also exterior to the casing, which normally unites them in working relation, and a device for rendering the connection inoperative and closing the valve suddenly.

2. In a valve of the character described, the combination of a casing, a valve, an actuator for closing it slowly under normal conditions, which includes a breakdown connection, and means responsive to abnormal conditions for breaking down the connection and closing the valve suddenly.

3. In a valve of the character described, the combination of a casing, a valve, a stem for the valve which projects through the casing, a means connected with the stem at a point exterior to the casing for moving the valve, which includes a toggle, and a means responsive to abnormal conditions for opening the toggle and closing the valve.

4. In a valve of the character described, the combination of a casing, a valve which is continually urged toward its seat by fluid-pressure, a stem for the valve, an abutment on the stem, a wheel for moving the valve slowly, and a device for striking the abutment for closing the valve suddenly.

5. In a valve of the character described, the combination of a casing, a valve subjected to differential pressures, a means by which the valve may be moved slowly, a connection which normally unites the valve and means in working relation, and a device responsive to pressure changes for rendering the said connection inoperative.

6. In a valve of the character described, the combination of a casing, a valve, a means for closing the valve, a connection between the valve and the means, which normally unites them in working relation, a device for rendering the connection inoperative and closing the valve suddenly, and a dash-pot for cushioning the movement of the valve.

7. In a valve of the character described, the combination of a casing, a valve, a means for closing the valve, a connection between the valve and the means, which normally unites them in working relation, a device for rendering the connection inoperative and closing the valve suddenly, a piston attached to the valve-stem, and a cylinder formed in the casing, in which fluid is trapped to cushion the closing of the valve.

8. In a valve of the character described, the combination of a casing, a valve, a stem, a means connected with the stem at a point outside of the casing for moving the valve under normal conditions, one or more collapsible devices which unite the valve and means, and a weight for releasing the device or devices.

9. In a valve of the character described, the combination of a casing, a valve, a wheel for moving the valve under normal conditions, a yoke attached to the valve-stem, toggles between the wheel and yoke, and an emergency device for releasing the toggles.

10. In a valve of the character described, the combination of a casing, a valve, a means for moving the valve under normal conditions, toggles between the valve and means, means for releasing the toggles, and a weight which first operates the toggle-releasing means and thereafter closes the valve.

11. In a valve of the character described, the combination of a casing, a valve, a stem for the valve, a yoke attached to the stem, a wheel, toggles between the yoke and wheel, and means for opening the toggles outwardly to permit the valve to be closed suddenly.

12. In a valve of the character described, the combination of a casing, a valve, a stem for the valve, a yoke attached to the stem, a wheel, toggles for moving the valve slowly, pivots for the toggles carried by the yoke and the wheel, arms or projections on the upper members of the toggle for opening them, and means arranged to engage the arms when it is desired to open the toggles.

13. In a valve of the character described, the combination of a casing, a valve, a stem therefor which is guided at its lower end by the casing, an arm carried by the casing for guiding the upper end of the stem, a collapsible means by which the valve may be moved slowly, and a weight normally supported by the arm and guided by the stem for collapsing said means and shutting the valve.

14. In a valve of the character described, the combination of a casing, a valve, a stem therefor, an arm supported by the casing for guiding the upper end of the stem, and an emergency device for closing the valve which includes a piston and cylinder supported by the arm.

15. In a valve of the character described, the combination of a casing, a valve, a means for closing the valve which is exterior to and supported by the casing, and a fluid-pressure-actuated device for releasing the said means which is also exterior to the casing.

16. In a valve of the character described, the combination of a casing, a valve, a weight for closing the valve, a latch which normally sustains the weight, and a means responsive to changes in fluid-pressure for permitting the weight to drop and suddenly close the valve.

17. In a valve of the character described, the combination of a casing, a valve, a weight for closing the valve, a latch which normally sustains the weight, and a fluid-pressure-actuated means for withdrawing the latch and permitting the weight to drop and suddenly close the valve.

18. In a valve of the character described, the combination of a valve, a casing therefor, a means for closing the valve in case of emergency, and a fluid-pressure device acting in response to changes in pressure of the lubricant supplied to a bearing for releasing said means.

19. In combination, a prime mover, a valve for regulating the admission of motive fluid thereto, a source of lubricant under pressure for a bearing in the prime mover, means for closing the valve, and a device responsive to a change in pressure of the lubricant for starting the means into operation.

20. In a valve of the character described, the combination of a valve, a casing therefor, an emergency means for closing the valve, a latch for restraining the means, an automatic device for starting the means into operation, and a lock to prevent the device from acting.

21. In a valve of the character described, the combination of a valve, a casing therefor, an emergency means for closing the valve, a latch for restraining the means, an automatic device for withdrawing the latch, and a lock by means of which the withdrawal of the latch can be prevented.

22. In a valve of the character described, the combination of a valve, a casing therefor, having a screw-threaded extension, a wheel mounted on the extension for moving the valve slowly, a stem for the valve, a collapsible connection between the wheel and the stem, a means surrounding the stem which first causes the connection to collapse and thereafter closes the valve, and a device for controlling the action of said means.

23. In a valve of the character described, the combination of a valve, a casing therefor, a dash-pot for cushioning the closing of the valve, a valve-stem, an arm supported by the casing for guiding one end of the valve-stem, a screw-threaded projection on the valve-casing, a wheel correspondingly threaded and mounted on the projection for moving the valve, a breakdown connection between the wheel and the valve, a weight which surrounds the stem, a latch carried by the arm for sustaining the weight, and a fluid-controlled device also mounted on the arm for withdrawing the latch and permitting the weight to fall and operate the breakdown connection and thereafter close the valve.

24. In a valve of the character described, the combination of a valve, a casing therefor, an emergency device for operating the valve which includes a breakdown connection, a wheel for opening and closing the valve under normal conditions and for resetting the breakdown connection after the emergency device operates, and a means for resetting the breakdown connection.

25. In a valve of the character described, the combination of a valve, a casing therefor, an emergency device for operating the valve which includes a breakdown connection, and a wheel for opening and closing the valve under normal conditions and for resetting the breakdown connection after the emergency device operates.

26. In a valve of the character described, the combination of a valve, a casing therefor, a valve-actuator which includes a breakdown connection, a weight for closing the valve under emergency conditions, and means located in the path of the falling weight which break the connection and then move out of the path of the weight and permit it to strike a robust part of the valve-actuator.

27. In a valve of the character described, the combination of a valve, means for opening and closing the valve, an emergency device for closing the valve suddenly, and a lock for the emergency device, which is set by hand and released automatically.

28. In a valve of the character described, the combination of a valve, means for opening and closing the valve, an emergency device for closing the valve suddenly, a lock for the emergency device, which is set by hand, and automatic means for releasing the lock after normal conditions have been established.

29. In a valve of the character described, the combination of a valve, means for opening and closing the valve, an emergency device for closing the valve suddenly, a lock for the emergency device, which is set by hand, and fluid-actuated means for releasing the lock after normal conditions have been established.

30. In a valve of the character described, the combination of a main valve, a relay-valve for admitting fluid under pressure to the under side of the main valve, a means for opening and closing the main and relay valves, and an emergency device which first closes the relay-valve and thereafter the main valve.

31. In a valve of the character described, the combination of a main valve, a relay-valve for admitting fluid under pressure to the under side of the main valve, a stem which is attached to the relay-valve for opening and closing the main and relay valves, and an emergency device which first closes the relay and thereafter the main valve.

32. In combination, a throttle-valve for controlling the passage of motive fluid, a casing therefor, a means exterior of the casing for moving the valve in a manner to vary the effective opening for the passage of fluid, a connection between the valve and the means also exterior of the casing which normally unites them in working relation, and a device responsive to abnormal speed conditions of the apparatus being controlled for rendering the connection inoperative and closing the valve suddenly.

33. The combination of a casing, a valve within the casing, a stem for said valve having its ends extending through the walls of the casing, the diameter of the portion of the stem extending through one wall being less than the diameter of the portion extending through the opposite wall, the difference in area exposed to the fluid rendering the valve when open unbalanced with a tendency to close, a device for holding said valve open against the unbalanced pressure, and a means for releasing said device to close the valve.

34. The combination of a casing, a main valve within the casing which is held against its seat by the fluid-pressure when closed, a relay-valve seated on the main valve and controlling a passage through which the fluid may flow from one side of the main valve to the other, to substantially equalize the pressure on opposite sides of said valve, a means for opening and closing the main and relay valves which opens the relay in precedence to the main valve, including a valve-stem extending through the walls of the casing, the diameter of the portion of the stem extending through one wall being less than the diameter of the portion extending through the opposite wall, the difference in area exposed to the fluid rendering said main valve unbalanced when open so that it has a tendency to close, a device for holding said valve open against the unbalanced pressure, and a means for releasing said device to close the valve.

In witness whereof I have hereunto set my hand this 29th day of March, 1904.

RICHARD H. RICE.

Witnesses:
DUGAL McK. McKILLOP,
ELMER H. SCHWARZ.

DISCLAIMER.

838,455.—*Richard H. Rice*, Lynn, Mass. COMBINED EMERGENCY AND THROTTLE VALVE. Patent dated December 11, 1906. Disclaimer filed March 2, 1912, by the assignee, *General Electric Company*.

Enters this disclaimer—

"To that part of the claims which is identified as follows, to wit:

"33. The combination of a casing, a valve within the casing, a stem for said valve having its ends extending through the walls of the casing, the diameter of the portion of the stem extending through one wall being less than the diameter of the portion extending through the opposite wall, the difference in area exposed to the fluid rendering the valve when opened unbalanced with a tendency to close, a device for holding said valve open against unbalanced pressure, and a means for releasing said device to close the valve.

"34. The combination of a casing, a main valve within the casing which is held against its seat by the fluid-pressure when closed, a relay-valve seated on the main valve and controlling a passage through which the fluid may flow from one side of the main valve to the other, to substantially equalize the pressure on opposite sides of said valve, a means for opening and closing the main and relay valves which opens the relay in precedence to the main valve, including a valve-stem extending through the walls of the casing, the diameter of the portion of the stem extending through one wall being less than the diameter of the portion extending through the opposite wall, the difference in area exposed to the fluid rendering said main valve unbalanced when open so that it has a tendency to close, a device for holding said valve open against the unbalanced pressure, and a means for releasing said device to close the valve."

[OFFICIAL GAZETTE, *March 12, 1912.*]

*Disclaimer in Letters Patent No. 838,455.* trolling a passage through which the fluid may flow from one side of the main valve to the other, to substantially equalize the pressure on opposite sides of said valve, a means for opening and closing the main and relay valves which opens the relay in precedence to the main valve, including a valve-stem extending through the walls of the casing, the diameter of the portion of the stem extending through one wall being less than the diameter of the portion extending through the opposite wall, the difference in area exposed to the fluid rendering said main valve unbalanced when open so that it has a tendency to close, a device for holding said valve open against the unbalanced pressure, and a means for releasing said device to close the valve.

In witness whereof I have hereunto set my hand this 29th day of March, 1904.

RICHARD H. RICE.

Witnesses:
DUGAL McK. McKILLOP,
ELMER H. SCHWARZ.

DISCLAIMER.

838,455.—*Richard H. Rice*, Lynn, Mass. COMBINED EMERGENCY AND THROTTLE VALVE. Patent dated December 11, 1906. Disclaimer filed March 2, 1912, by the assignee, *General Electric Company*.

Enters this disclaimer—

"To that part of the claims which is identified as follows, to wit:

"33. The combination of a casing, a valve within the casing, a stem for said valve having its ends extending through the walls of the casing, the diameter of the portion of the stem extending through one wall being less than the diameter of the portion extending through the opposite wall, the difference in area exposed to the fluid rendering the valve when opened unbalanced with a tendency to close, a device for holding said valve open against unbalanced pressure, and a means for releasing said device to close the valve.

"34. The combination of a casing, a main valve within the casing which is held against its seat by the fluid-pressure when closed, a relay-valve seated on the main valve and controlling a passage through which the fluid may flow from one side of the main valve to the other, to substantially equalize the pressure on opposite sides of said valve, a means for opening and closing the main and relay valves which opens the relay in precedence to the main valve, including a valve-stem extending through the walls of the casing, the diameter of the portion of the stem extending through one wall being less than the diameter of the portion extending through the opposite wall, the difference in area exposed to the fluid rendering said main valve unbalanced when open so that it has a tendency to close, a device for holding said valve open against the unbalanced pressure, and a means for releasing said device to close the valve."

[OFFICIAL GAZETTE, *March 12, 1912.*]

DISCLAIMER.

838,455.—*Richard H. Rice*, Lynn, Mass. COMBINED EMERGENCY AND THROTTLE VALVE. Patent dated December 11, 1906. Disclaimer filed March 2, 1912, by the assignee, *General Electric Company*.

Enters this disclaimer—

"To that part of the claims which is identified as follows, to wit:

"33. The combination of a casing, a valve within the casing, a stem for said valve having its ends extending through the walls of the casing, the diameter of the portion of the stem extending through one wall being less than the diameter of the portion extending through the opposite wall, the difference in area exposed to the fluid rendering the valve when opened unbalanced with a tendency to close, a device for holding said valve open against unbalanced pressure, and a means for releasing said device to close the valve.

"34. The combination of a casing, a main valve within the casing which is held against its seat by the fluid-pressure when closed, a relay-valve seated on the main valve and controlling a passage through which the fluid may flow from one side of the main valve to the other, to substantially equalize the pressure on opposite sides of said valve, a means for opening and closing the main and relay valves which opens the relay in precedence to the main valve, including a valve-stem extending through the walls of the casing, the diameter of the portion of the stem extending through one wall being less than the diameter of the portion extending through the opposite wall, the difference in area exposed to the fluid rendering said main valve unbalanced when open so that it has a tendency to close, a device for holding said valve open against the unbalanced pressure, and a means for releasing said device to close the valve."

[OFFICIAL GAZETTE, *March 12, 1912.*]